Feb. 16, 1971    R. W. DRUSHEL    3,564,528
ELECTRONIC CONTROL CIRCUIT
Filed Nov. 18, 1966    6 Sheets-Sheet 1

FIG.1

INVENTOR.
ROBERT W. DRUSHEL
BY Whittemore, Hulbert & Belknap
ATTORNEYS

FIG.2

Feb. 16, 1971  R. W. DRUSHEL  3,564,528
ELECTRONIC CONTROL CIRCUIT
Filed Nov. 18, 1966  6 Sheets-Sheet 5

INVENTOR.
ROBERT W. DRUSHEL
BY
ATTORNEYS

FIG.8

INVENTOR.
ROBERT W. DRUSHEL
BY
ATTORNEYS

United States Patent Office 3,564,528
Patented Feb. 16, 1971

3,564,528
ELECTRONIC CONTROL CIRCUIT
Robert W. Drushel, Farmington, Mich., assignor to Ex-Cell-O Corporation, Detroit, Mich., a corporation of Michigan
Continuation-in-part of applications Ser. No. 573,999, Aug. 22, 1966; Ser. No. 583,875, Oct. 3, 1966; Ser. No. 585,395, Oct. 10, 1966; and Ser. No. 595,189, Nov. 17, 1966, now Patent No. 3,471,750. This application Nov. 18, 1966, Ser. No. 595,442
Int. Cl. G08b 23/00
U.S. Cl. 340—248          13 Claims

ABSTRACT OF THE DISCLOSURE

An electronic control circuit for use in conjunction with electro-chemical machining apparatus comprising means for simultaneously sensing a plurality of parameters of an electric circuit and providing an output signal when a parameter has an undesired characteristic, switching means operably associated with the sensing means for receiving the output signals from the sensing means, and means operably associated with and actuated in response to the switching means for providing an output signal in accordance with the logic of the output signals received by the switching means operable to control the electro-chemical circuit and the corresponding control method. The parameters sensed include maximum current, current increase or decrease, minimum or threshold voltage, voltage surge, voltage shorting or gap spark-over, and maximum current and voltage. Means are also disclosed for sensing when the current reaches a predetermined percent of maximum current before the voltage reaches a threshold value as a separate parameter, for preventing control in response to a sensed power line transient signal causing variation in machining circuit current and voltage, and for preventing an output signal to control the electro-chemical machining circuit during start-up for an adjustable predetermined period except when a voltage short or gap spark-over is sensed. A method of and means for indicating which parameter has provided the output signal due to an undesirable characteristic thereof is also disclosed.

---

This application is a continuation-in-part of patent applications Ser. No. 573,999, filed Aug. 22, 1966, Ser. No. 583,875, filed Oct. 3, 1966, Ser. No. 585,395, filed Oct. 10, 1966, and Ser. No. 595,189 filed Nov. 17, 1966 now Pat. No. 3,471,750.

The invention relates to means for and a method of controlling electric circuits and refers more specifically to an electronic control circuit for and method of simultaneously sensing a plurality of parameters of an electric circuit, providing a signal in response to sensing of an undesirable parameter value in the electric circuit due to conditions within the electric circuit for controlling the electric circuit and indicating the parameter having the undesirable parameter.

Apparatus for electrical machining have long been known. Such apparatus have in the past however often been inefficient and wasteful. For example, in operation of known electro-chemical machining apparatus it has often occurred that an electrical parameter of a machining circuit has departed from a desired parameter value sufficiently to severely damage a workpiece being machined and/or the tool or electrode in the machining circuit. Thus current in excess of a maximum current in the machining circuit, and certain current increases and decreases are detrimental to an electro-chemical machining process. Similarly certain current and voltage relations, short circuits and sparking between the electrode and work in an electro-chemical machining circuit have been found to be associated with undesirable machining characteristics. Circuits having such parameters or characteristics should be deenergized.

However, it is undesirable to shut down electro-chemical machining apparatus, for example, during a machining operation unless there is immediate danger of damage to the work or electrode or to the apparatus itself. Thus voltage and current parameters or characteristics in electro-chemical machining apparatus caused for example by power line transient signals rather than an undesirable condition in the cutting circuit should not cause shutting down of the electro-chemical machining apparatus.

Machining circuit current and voltage have previously been sensed in such apparatus and used to control the operation of the apparatus. However, with prior control circuits, the circuit parameters sensed have not been sensed in time to prevent damage to the work or tool when an undesirable cutting condition existed. In addition with prior known apparatus there has usually been no way to tell which circuit parameter or characteristic produced control of the apparatus. The operator has thus been left wondering what difficulty his apparatus had encountered when, for example as undesired parameter or characteristic of the machining circuit has caused his apparatus to turn off.

It is therefore one of the purposes of the present invention to provide an improved means for and method of controlling an electric circuit in accordance with the parameters of characteristics thereof.

Another object is to provide means for and a method of simultaneously sensing a plurality of electrical parameters or characteristics of an electro-chemical machining circuit or the like and controlling the electro-chemical machining circuit in accordance with undesirable sensed electrical parameter or characteristic conditions.

Another object is to provide a means and method as set forth above wherein one of the parameters of the circuit sensed is maximum current.

Another object is to provide a means and method as set forth above wherein one of the parameters of the circuit sensed is current increase or decrease.

Another object is to provide a means and method as set forth above wherein one of the parameters of the circuit sensed is minimum or threshold voltage.

Another object is to provide a means and method as set forth above wherein one of the parameters of the circuit sensed is voltage surge.

Another object is to provide a means and method as set forth above wherein one of the characteristics of the circuit sensed is voltage shorting or gap spark-over.

Another object is to provide a means and method as set forth above wherein the parameters of the circuit sensed are current and voltage and the circuit is controlled in accordance with whether or not the current reaches a predetermined percent of maximum current before the voltage reaches a threshold value.

Another object is to provide a means and method as set forth above and further including a means for and method of sensing a power line transient signal and preventing control of the electric circuit due to current increase or decrease in response thereto.

Another object is to provide a means and method as set forth above and further including a means for and a method of preventing control of the electric circuit in accordance with current increase and decrease for an adjustable blanking period on start-up of the electric circuit.

Another object is to provide a means and method as set forth above and further including a means for and method of preventing control of the electric circuit as the result of any of the sensed parameters, except voltage short or gap spark-over for a predetermined blanking time on start-up of the electric circuit.

Another object is to provide a means and method as set forth above and further including a means for and a method of indicating an undesirable parameter or characteristic of the electric circuit in accordance with which the electric circuit is controlled.

Another object is to provide a means for and method of sensing the parameters or characteristics of an electric circuit and controlling the electric circuit in accordance therewith which is simple, economical and efficient.

Other objects and features of the invention will become apparent as the description proceeds, especially when taken in conjunction with the accompanying drawings, illustrating a preferred embodiment of the invention, wherein:

With particular reference to the figures of the drawings, one embodiment of the present invention will now be disclosed in detail.

Figure 1:
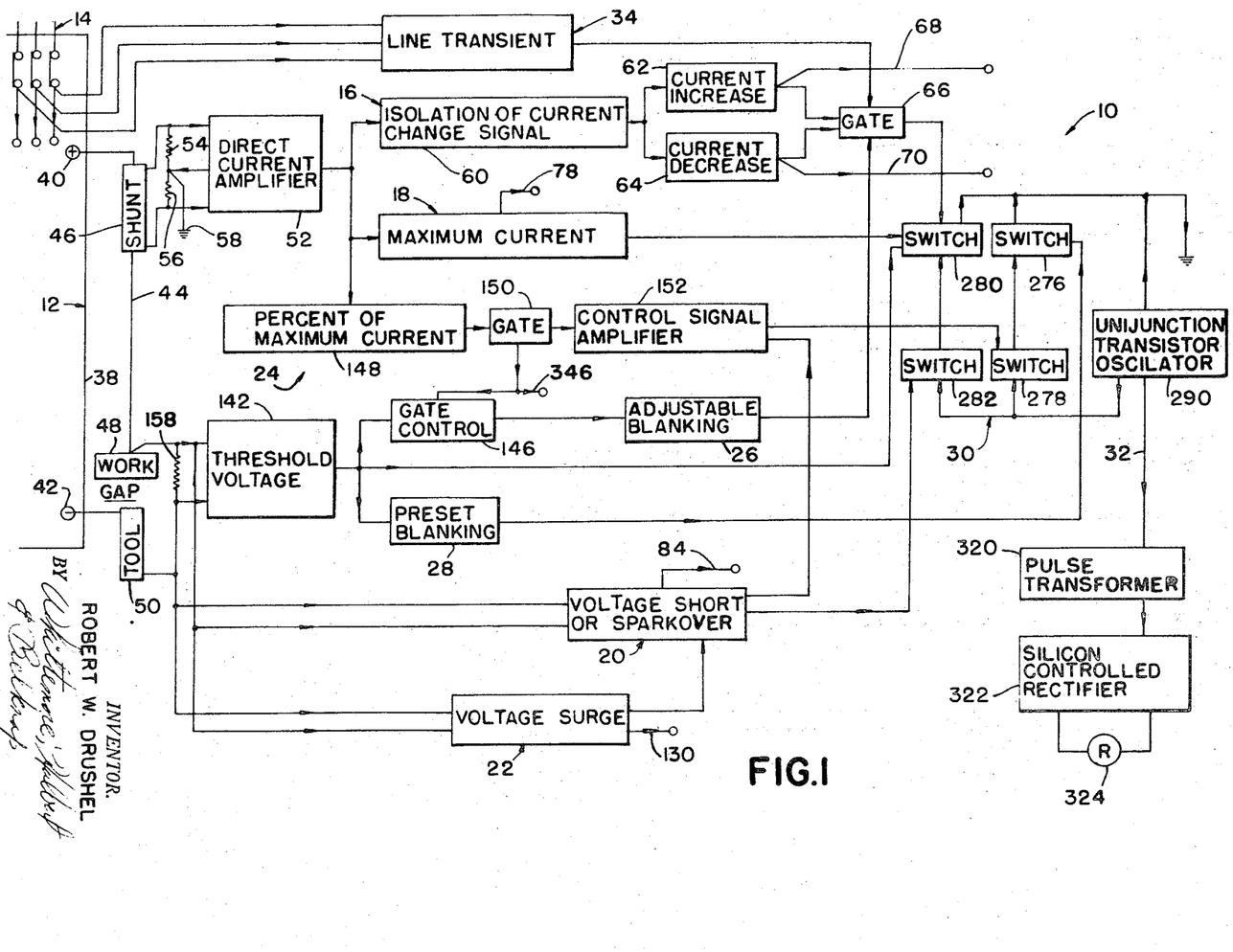
FIG. 1 is a block diagram of an electronic control circuit constructed in accordance with the invention in conjunction with electro-chemical machining apparatus.

The electronic control circuit 10 of the invention is shown connected to electro-chemical machining apparatus 12 which receives electrical energy from the three phase electrical power line 14. The control circuit 10 includes a circuit 16 responsive to current increase or decrease in the machining circuit 44 of the electro-chemical machining apparatus 12, a circuit 18 responsive to the maximum current in the machining circuit of the electro-chemical machining apparatus 12 and circuits 20 and 22, respectively, responsive to voltage shorts or gap spark-over and gap voltage surge in the machining circuit of the electro-chemical machining apparatus 12. In addition the control circuit 10 includes the percent of maximum current and threshold voltage comparing circuit 24 and the blanking circuits 26 and 28.

Each of the current increase and decrease circuit 16, maximum current circuit 18, percent of maximum current and threshold voltage comparing circuit 24, the voltage short or gap spark-over circuit 20 and the voltage surge circuit 22 sense parameters or characteristics of the machining circuit 44 of the apparatus 12 and actuate a switching circuit 30 in accordance therewith. The switching circuit 30 in turn controls an output control circuit 32 effective to control the machining circuit 44 of the electro-chemical machining apparatus 12. The blanking circuits 26 and 28 are provided to prevent occurrence of a signal from circuit 16 and to close a portion of the switching circuit 30 on start-up of the apparatus 12.

The control circuit 10 further includes the line transient signal circuit 34. The line transient signal circuit 34 is provided to prevent an output from the current increase and decrease circuit 16 due to current increase or decrease in the machining circuit 44 caused by a transient signal in power line 14.

Figure 2:
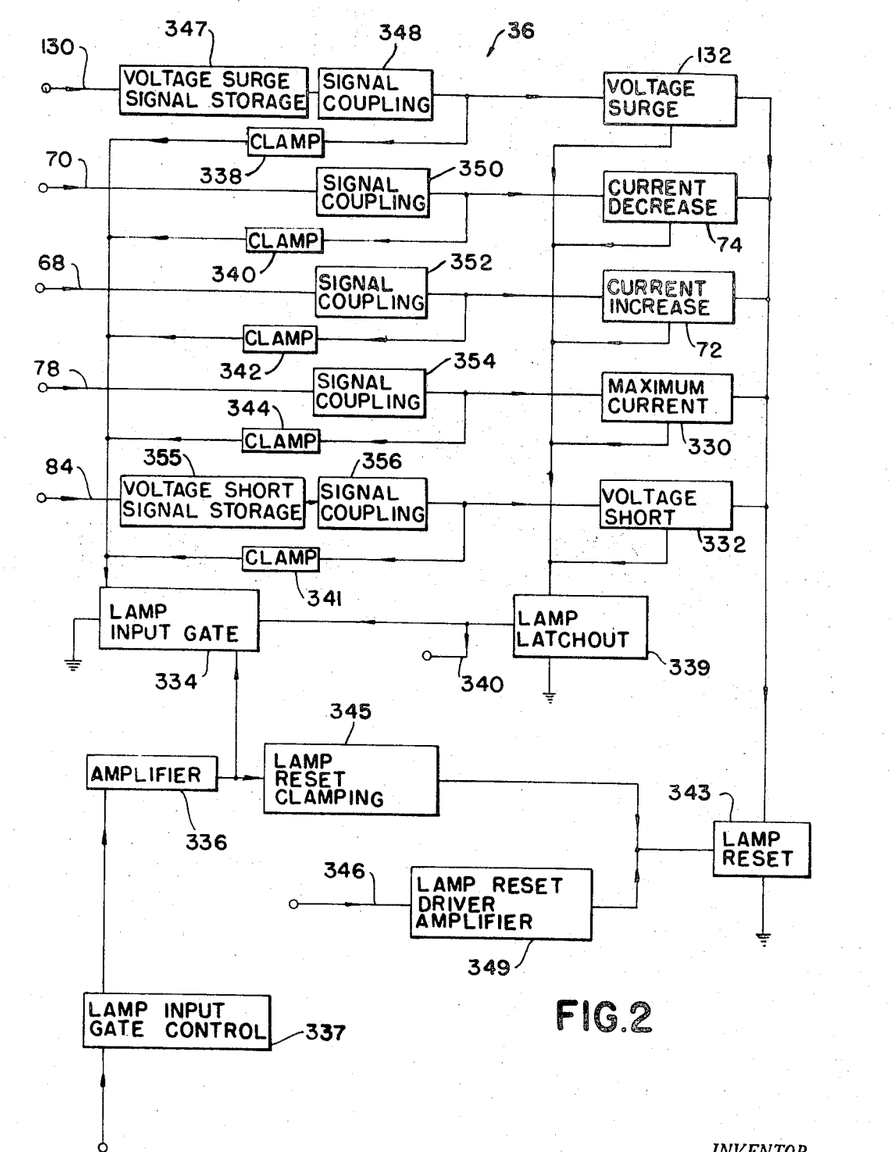
FIG. 2 is a block diagram of an indicator lamp circuit for use with the control circuit of FIG. 1.

The indicator lamp circuit 36 includes separate lamp circuits for indicating voltage surge, current decrease, current increase, maximum current and voltage short undesirable conditions in accordance with which of the parameters or characteristics is effective to provide an output signal from the output control circuit 32 to shut down the electro-chemical machining apparatus 12.

Further the indicator lamp circuit 36 is effective to maintain a lamp circuit energized which was energized due to an undesirable characteristic of the machining circuit 44 even after the electro-chemical machining apparatus 12 has shut down to provide a permanent indication of the type of fault causing shut down of the apparatus 12. The energized lamp circuit will remain energized until the control circuit 10 is recycled or the indicator lamp circuit 36 is otherwise reset.

Figure 8:
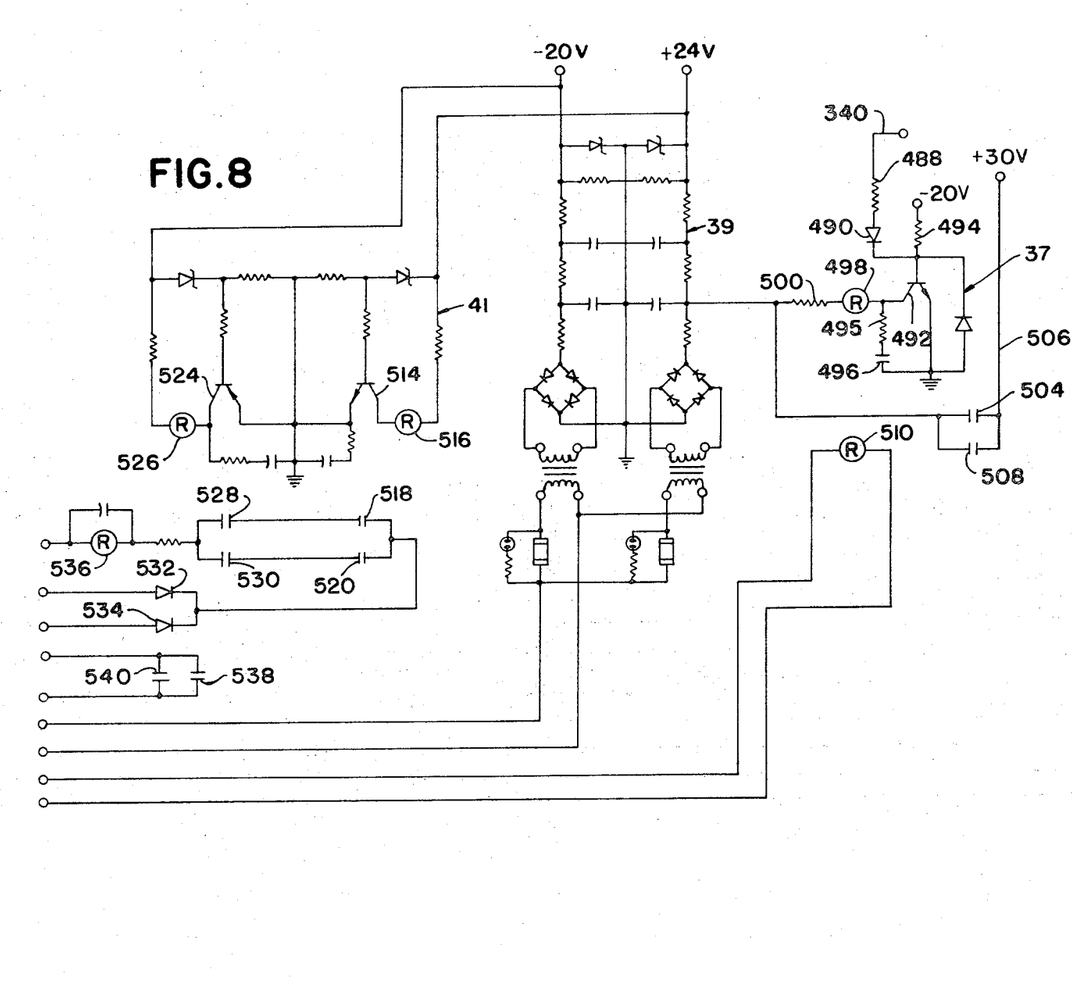
FIG. 8 is a schematic diagram of a voltage supply circuit and a voltage checking circuit used with the control circuit and machining apparatus of FIG. 1 and an indicator lamp circuit voltage holding circuit used with the indicator lamp circuit of FIG. 2 and the control circuit and machining apparatus of FIG. 1.

The indicator lamp circuit voltage holding circuit 37, regulated voltage supply circuit 39 and the voltage checking circuit 41, illustrated in FIG. 8, are operable to maintain the indicator lamp circuit 36 in the energized condition when a fault has been indicated thereby regardless of the shutting down of the apparatus 12 by means outside of the control circuit 10, as for example, the stop pushbutton of the apparatus 12, to provide the regulated voltages necessary for the operation of the electronic control circuit 10 and to check the necessary operating voltages for both the electronic control circuit 10 and the electro-chemical machining apparatus 12, respectively.

More specifically the electro-chemical machining apparatus 12, as shown in FIG. 1, includes a main power rectifier 38 which is connected to the three phase electrical power line 14 to produce an output between the terminals 40 and 42 thereof of for example ten thousand amperes direct current at up to, for example twenty volts. The electro-chemical machining apparatus 12 further includes the cutting circuit 44 having the fifty millivolt shunt 46 therein in series with work to be machined 48 and an electrode tool 50 between the terminals 40 and 42 of the main power rectifier 38. The electro-chemical machining apparatus 12 also must include some means for controlled advancing of the work 48 and the tool 50 toward each other and means for maintaining an electrolyte in the gap between the work and tool. Since electro-chemical machining apparatus such as apparatus 12 is well known, the electro-chemical machining apparatus 12 and the electrical power line 14 which feeds such apparatus will not be considered in further detail herein.

The current increase and decrease circuit 16 includes a direct current amplifier 52 connected across the resistors 54 and 56 which are in series with each other and connected to electronic common 58 at their junction. The series resistors 54 and 56 are connected across the shunt 46, as shown. The current increase and decrease circuit 16 further includes the ripple compression, current change isolation and amplification circuit 60, connected to receive the output of the amplifier circuit 52. Current increase and decrease detector and adjustable control signal producing circuits 62 and 64, respectively, are connected to circuit 60. As shown the current increase and current decrease circuits 62 and 64 are connected in parallel and both feed the control signal gate 66. In addition the current increase and current decrease circuits 62 and 64 have the output conductors 68 and 70, respectively, for providing an output to the indicator lamp circuit 36 at the same time an output is provided to the gate 66.

The current increase and decrease circuit 16 functions to sense the changes in current in the machining circuit 44 and to provide an output signal to the gate 66 in response to a selected current increase or in response to a separately selected current decrease which signal is operable on the gate 66 being opened to open the switch 280 in the switching circuit 30 so that an output will be provided from the output control circuit 32 after the blanking circuits 26 and 28 have timed out to, for example, deenergize the electro-chemical machining apparatus 12 and energize the lamp circuit 72 or 74 in the indicator lamp circuit 36 depending on whether the sensed current change producing the signal through the gate 66 has been a current increase or a current decrease.

The complete operation of the current increase and decrease circuit 16 and blanking circuit 26 has been explained in detail along with the schematic diagram of the current increase and current decrease circuit 16 and the adjustable blanking circuit 26 in the above referenced patent application, Ser. No. 585,395 to which reference is made herein for a more detailed disclosure. The current increase and decrease circuit 16 and blanking circuit 26 will therefore not be considered in further detail herein except to point out that the gate 66 is the output control amplifier 48 in the prior application and the diode 230 of the blanking circuit 26 of the prior application is connected to receive the output of the gate control circuit 146 of the control circuit 10.

The maximum current circuit 18 as shown receives a signal from the direct current amplifier 52 and provides an output to the switching circuit 30 on the current in the machining circuit 44 of the electro-chemical machining apparatus 12 exceeding a selected maximum current which current is determined to be the maximum allowable without injury to the electro-chemical machining apparatus 12, the work 48 or the tool 50.

On sensing of the preset maximum allowable current by the maximum current circuit 18, the switch 280 of the circuit 30 will be opened as before to produce an output from the output control circuit 32 to shut down the electro-chemical machining apparatus 12. Again a conductor 78 is provided from the maximum current circuit 76 to the indicator lamp circuit 36 so that on an output being provided from the output control circuit 32, the maximum current lamp circuit will be energized indicating what electrical parameter of the electro-chemical machining apparatus machining circuit 44 caused the shut-down of the apparatus.

The maximum current circuit 18 and direct current amplifier 52 from which it receives its input signal have been fully explained in conjunction with the schematic diagrams thereof in the patent application, Ser. No. 573,999 referred to above. In the prior patent application the conductor 78 is connected to the collector of the transistor 158 between the resistors 162 and 172. A portion of the switching circuit 30 and output control circuit 32 are also disclosed in detail in patent application, Ser. No. 573,999 to provide a complete disclosure therefor. Reference is made to this prior patent application for a more complete treatment of the direct current amplifier, the maximum current circuit 18 and output control circuit 32 which will not be considered in further detail herein.

The gap voltage short or gap spark-over circuit 20 is connected between the work 48 and tool 50, and to the gap voltage surge circuit 22, as shown. The circuit 20 provides an output to the switching circuit 30, the percent of maximum current and voltage threshold comparing circuit 24 and to the indicator lamp circuit 36 over the conductor 84.

The function of the voltage short or gap spark-over circuit 20 is to sense voltage sparks, shorts or other ionized paths between the work 48 and tool 50 which are extremely detrimental in an electro-chemical machining operation and to provide an output to the switching circuit 30 in response thereto which is effective to open switches 282 and 278 of the switching circuit 30 and consequently energize the output control circuit 32 and shut down the electro-chemical machining apparatus 12. The circuit 20 is effective to provide an output from the output control circuit 32 even during the preset blanking time of the control circuit 10 provided by blanking circuit 28 during start-up of apparatus 12, as will be considered subsequently.

The voltage short or gap spark-over circuit 20 is considered in detail in the above referenced patent application, Ser. No. 583,875 and will not therefore be considered in detail herein. It will however be noted that the signal output to the conductor 84 and to circuit 24 will be from the collector of the transistor 80 and between the resistor 88 and condenser 118 of the circuit of FIG. 2 of the prior patent application and that the input signal from the gap voltage surge circuit 22 will be provided on the base of the transistor 104 of the prior application.

Figure 3:
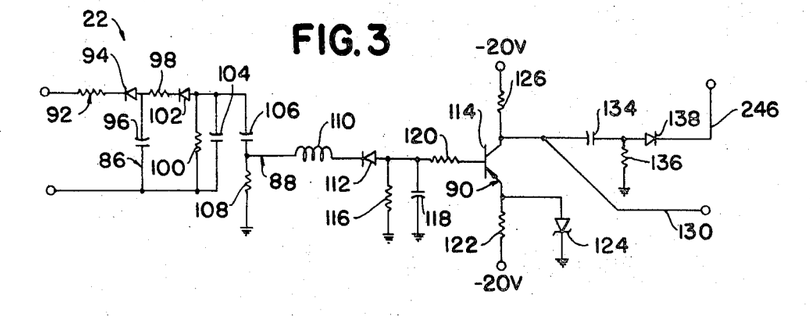
FIG. 3 is a schematic diagram of the voltage surge circuit of the block diagram of FIG. 1.

The gap voltage surge circuit 22 as shown in schematic diagram form in FIG. 3 includes the input filter circuit 86, the alternating current coupling circuit 88, and the output amplifier circuit 90.

More specifically, the input filter circuit 86 includes the resistor 92, diode 84, and capacitor 96 along with the additional resistors 98 and 100, diode 102 and capacitor 104. The resistors 92, 98 and 100 along with the capacitors 96 and 104 diminish severe voltage variations present across the work 48 and tool 50 without any detrimental effect on the voltage surge signal information at that point. The diodes 94 and 102 prevent feedback during filtering. Obviously the input filter circuit 86 will not appreciably filter a voltage surge which it is desired to sense.

The coupling circuit 88 includes the capacitor 106, resistor 108 and choke coil 110. The capacitor 106 is an alternating current coupling member for passing only the variation or alternating component of the voltage signal across the resistor 108 through coil 110 and diode 112 to the base of the transistor 114. Choke coil 110 is provided to filter out signal spikes which may pass capacitor 106 while diode 112 prevents feed-back across resistor 116 and capacitor 118, which are also provided to remove any remaining spikes that may pass through diode 112.

The amplifier circuit 90 includes the transistor 114 having a base connected to receive the signal across the resistor 116 and capacitor 118 through the current limiting resistor 120. Transistor 114 further includes the emitter connected through resistor 122 to the source of minus twenty volts negative potential illustrated and connected through the Zener diode 124 to ground. The collector of the transistor 114 is connected through the resistor 126 to the source of negative twenty volt electrical energy shown.

An output is taken from the collector of transistor 114 to the indicator lamp circuit 36 over conductor 130 to energize the voltage surge lamp circuit 132 in the indicator lamp circuit 36. The same output from the transistor 114 is fed through capacitor 134 over resistor 136, through diode 138 and over conductor 246 to the base of the transistor 104 in the voltage short or gap spark-over circuit 20 illustrated in application, Ser. No. 583,875 referenced above. The diode 138 is provided to insure opening of switch 282 of the switching circuit 30 only on a positive signal from the front edge of the voltage surge signal sensed by the voltage surge circuit 22 and to isolate the voltage surge circuit 22 from feedback from circuit 20.

Thus in operation of the voltage surge circuit 22 on occurrence of a voltage surge across the gap between the work 48 and the tool 50, the surge will be passed through the filter circuit 86 where severe voltage variations are filtered but the voltage surge signal is not substantially changed in character or delayed for any appreciable period. The filtered voltage surge signal is then coupled across capacitor 106 to the base of the normally off transistor 114 after any spikes have been filtered from the voltage surge signal by the coil 110 and resistance 116 in conjunction with capacitor 118. The resistor 122 and negative voltage source in conjunction with the Zener diode 124 apply for example a minus 2.4 volt potential on the emitter of the transistor 114. Therefore, a rather small amplitude voltage surge of, for example two volts, will cause the transistor 114 to conduct whereby the signal on the collector will rapidly go from approximately minus twenty volts to approximately three volts to provide a large positive pulse on conductor 130 and through the diode 138 on the leading edge of the voltage surge reaching the critical value of, for example two volts.

Figure 4:
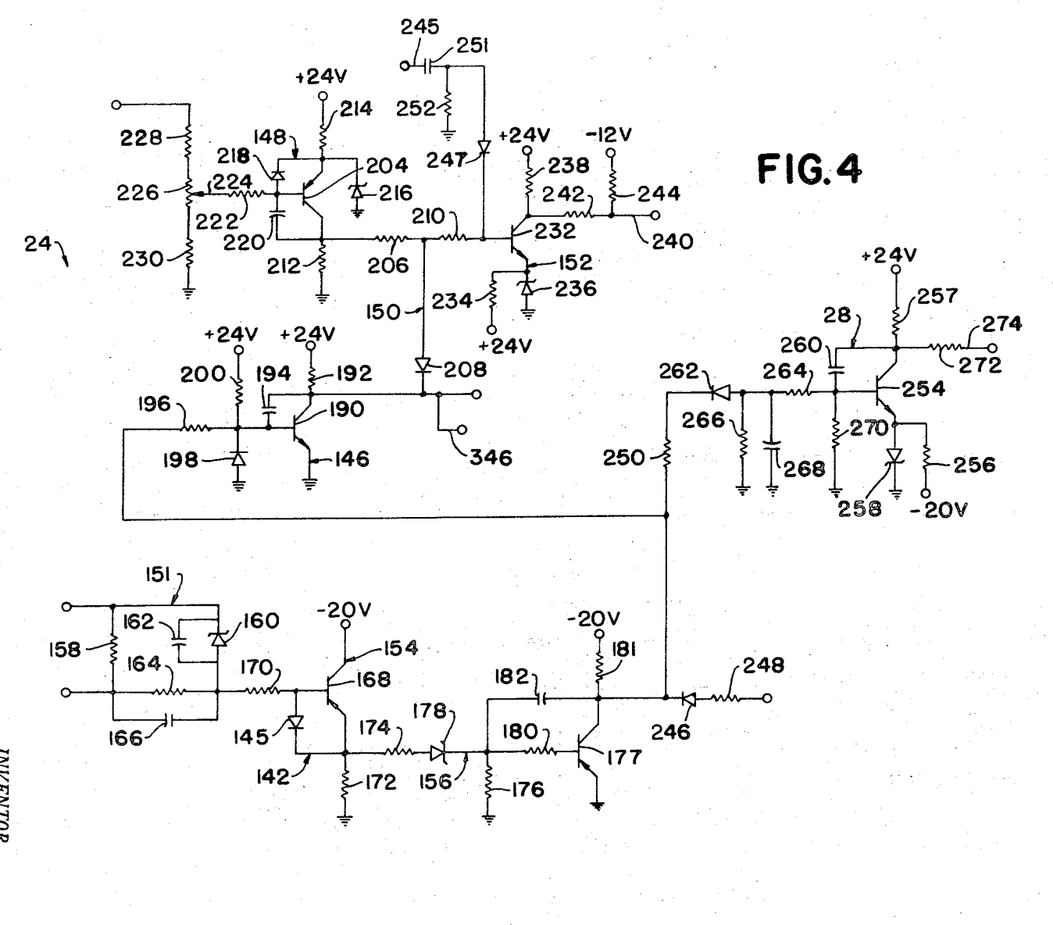
FIG. 4 is a schematic diagram of the percent of maximum current and threshold voltage comparison circuit and the preset blanking circuit of the block diagram of FIG. 1.

The percent of maximum current and voltage threshold comparing circuit 24 is shown in detail in FIG. 4, along with the preset blanking circuit 28. The circuit 24 includes the voltage threshold circuit 142 having the gap signal input portion 151, the isolation portion 154 and the voltage trip point selection and amplification portion 156. Circuit 24 further includes the adjustable percent of maximum current circuit 148, gate control circuit 146, gate circuit 150 and control signal amplifier circuit 152.

The gap signal input portion 151 of circuit 142 is connected directly across the work 48 and tool 50 and includes the resistor 158 connected across the gap, the Zener diode 160 and capacitor 162 connected in parallel across the resistor 158 for limiting the voltage applied to the isolating portion 154 of circuit 142 and the parallel resistor 164 and the capacitor 166 connected between the resistor 158 and the parallel capacitor 162 and Zener diode 160, as shown.

The signal input portion 151 of circuit 142 limits the current supplied to the isolation portion 154 of circuit 142 to that permitted by the Zener diode 160, removes the hash or extraneous signals found across the gap between the work 48 and tool 50 and through capacitor 166 provides a fast transfer of the voltage across the gap to the isolation portion of the circuit 142.

The isolation portion 154 of the circuit 142 includes the transistor 168 connected in emitter-follower configuration with the collector connected directly to the indicated minus twenty volt electrical energy source and the emitter connected to electric common through the resistor 172. The protecting diode 145 is connected between the emitter and base of the transistor 168. Thus the rest of the circuit following the isolation portion 154 is isolated from the gap voltages and the voltage appearing across the isolation portion 154 of circuit 142 is imposed on electronic common so as to be useful with the other signals in the electronic control circuit 10.

The portion 156 of circuit 142 includes the current limiting resistor 174, the Zener diode 178, resistor 176, resistor 180, a transistor 177, resistor 181 and capacitor 182 connected as shown in FIG. 4.

The Zener diode 178 is provided to prevent the voltage signal between the work 48 and tool 50 from driving the normally off transistor 177 on until it has attained a threshold voltage level of, for example two volts. Thus as will be seen subsequently, except for certain instances, such as in the case of voltage shorts or spark-overs, the control circuit 10 operates around a threshold voltage of approximately two volts established by the Zener diode 178.

The transistor 177 which is normally off conducts on receiving the threshold voltage through Zener diode 178 to provide a positive going output signal which varies between approximately minus sixteen and zero volts on the collector of the transistor 177 on turning on of the transistor. Capacitor 182 provides a time constant along with the resistors 176 and 181 so that turn-off of the transistor 177 is not as rapid as turn-on thereof.

Thus in operation the transistor 177 turns on sharply when the voltage across the gap is above the threshold level set by the Zener diode 178 and remains in this state until the voltage again crosses the threshold level in the opposite direction at which time the output signal from the transistor 177 will begin to fall toward the minus sixteen volts at a rate determined by the value of the time constant including capacitor 182. Consequently, short sparks and similar signals will not cause shutdown of the apparatus 12 due to loss of the threshold voltage output from circuit 142.

The gate control circuit 146 as shown best in FIG. 4, includes the normally off transistor 190 having the emitter connected directly to electronic common, as shown, and the collector connected to the twenty-four volt source of electrical energy through the resistor 192. The base of the transistor 190 is connected to the collector through the capacitor 194. The base of the transistor 190 is further connected to the collector of the transistor 177 of the threshold voltage circuit 142 through the current limiting resistor 196 and across the protecting diode 198. A source of twenty-four volt electrical energy is also connected to the base of the transistor 190 through the resistor 200, as shown.

In operation, the transistor 190 of the gate control circuit 146 is normally non-conducting whereby a large positive voltage is present on the collector which is fed to the adjustable blanking circuit 26, as shown in FIG. 1. When the voltage in the circuit 142 exceeds the threshold voltage set by the Zener diode 178, the signal from the collector of the transistor 177 provides a bias on the transistor 190 to turn the transistor on, whereby the collector of the transistor 204 of the percent of maximum current circuit 148 is placed substantially at ground through the resistor 206 and diode 208. The capacitor 194 provides the desired turn-on and turn-off time for the transistor 190 in conjunction with the resistors 196, 200 and 192.

The gate control circuit 146 is ineffective to prevent passage of a signal between the percent of maximum current circuit 148 and the control signal amplifier 152 through the gate circuit 150 when no signal is provided the gate control circuit 146 from the voltage threshold circuit 142. However, when a signal is present from the voltage threshold circuit 142, the grounding of the collector of the transistor 204 through the resistor 206, diode 208 and conducting transistor 190 is effective to prevent a signal passing to the control signal amplifier circuit 152 through gate 150.

The gate circuit 150 includes the resistor 206, resistor 210 and the diode 208. As indicated above, the function of the gate circuit 150 is to prevent a signal from passing to the control signal amplifier 152 from the percent of maximum current circuit 148 when the voltage across the gap is not at least equal to the threshold voltage established by the Zener diode 178.

The percent of maximum current circuit 148 again, as shown best in FIG. 4, includes the transistor 204 having the collector returned to electronic common through a resistor 212 and an emitter connected to a positive twenty-four volt source of electrical energy through a resistor 214. The operating voltage of the transistor 204 is determined by the Zener diode 216 connected to the emitter thereof, whereby for example, approximately eighteen volts may be present at the emitter. The emitter is tied to the base of the transistor 204 through a diode 218 to prevent inverse voltage peaks form harming the transistor 204 while the collector is connected to the base through the capacitor 220. The base of the transistor 204 is further connected through the current limiting resistor 222 to the wiper arm 224 of the variable resistor 226 in the voltage divider network, including the resistances 228, 226, and 230, which receive the output from the direct current amplifier 52.

Thus the signal appearing on the base of the transistor 204 of the percent of maximum current circuit 148 will be a selected portion of the maximum current through the shunt 46 in the machining circuit 44 of the electrochemical machining apparatus 12. When the electrochemical machining apparatus 12 is turned on the current through the shunt 46 and the voltage across the gap in the cutting circuit 44 will start to build up. At the selected current percentage, depending on the position of the wiper arm 224, as for example ten percent, the transistor 204 which is normally off will turn on to provide an output signal through the gate 150 to the control signal amplifier 152.

The control signal amplifier circuit 152 includes the normally off transistor 232 having an emitter connected to the source of positive twenty-four volt electrical energy through the resistor 234 and to electronic common through the Zener diode 236 which establishes for example a 2.4 volt positive electrical signal on the emitter and a collector connected to the positive twenty-four volt source of electrical energy through the resistor 238.

The output signal from the control signal amplifier 152 is over the conductor 240 through resistor 242 and across the resistor 244 which in turn is connected to the negative twelve volt source of electrical energy, the purpose of which will be considered subsequently with regard to the switching circuit 30. The control signal amplifier circuit 152 serves to provide an output signal to open switch 278 of the switching circuit 30 on receipt of a positive going pulse from the percent maximum current select circuit 148.

As previously indicated the control signal amplifier circuit 152 is additionally connected through the conductor 245, diode 247 and a capacitor 251 across resistor 252 to the collector of the transistor 80 in the spark detect circuit disclosed in the patent application, Ser. No. 583,875. Thus on sparking being detected by the spark detect circuit 22, the switching circuit 30 is caused to open switch 278 due to a signal output from the control signal amplifier circuit 152 even though the voltage may not have reached the predetermined threshold voltage before the current has reached the predetermined selected percent of maximum current.

The preset blanking circuit 28 again as set forth in detail in FIG. 4 includes the normally off transistor 254 having an emitter connected to the minus twenty volt source of electrical energy through the resistor 256 and to electronic common through the Zener diode 258 which establishes an operating voltage point of approximately 2.4 volts on the emitter. The collector of the transistor 254 is connected to the positive twenty-four volt source of electrical energy through the resistor 257 and is connected back to the base of the transistor 254 through the capacitor 260 operable to delay automatic resetting of the blanking circuit 28.

As previously indicated the signal from the collector of the transistor 177 of the circuit 142 is connected to the base of the transistor 254 through the resistor 250, diode 262 and resistor 264 across the filter network including the resistor 266 and capacitor 268. The resistor 270 positioned between the base of the transistor 254 and ground helps establish the time constant of the preset blanking circuit 28.

Thus, in operation with the transistor 254 in the normally off condition, a blanking signal is provided the switching circuit 30 through the resistor 272 on conductor 274 to produce closing of the switch 276 in circuit 30. On the voltage reaching the predetermined level set by the Zener diode 178, the positive going signal from the collector of the transistor 177 will be removed from the base of the transistor 254 to turn the transistor 254 on after a time determined by the time constant of the resistors and capacitors in the circuit of the transistor 254. This time constant may be set to for example be equal to one-half second. After the one-half second the transistor remains on for the rest of the time the threshold voltage circuit 142 senses a voltage above the threshold level. Thus the switch 276 is held open after the predetermined blanking time. This time is sufficient to permit the machining circuit parameters, maximum current, voltage short or spark-over and voltage surge to stabilize sufficiently to permit use thereof in the control circuit 10.

The blanking circuit 28 is necessary to prevent the electronic control circuit 10 from calling for shutdown of the electro-chemical machining apparatus 12 due to voltage and current changes required in attaining the normal voltage and current signals across the gap in the cutting circuit 44. After the preset one-half second time delay provided by the circuit 28, the output from the preset blanking circuit 28 to the switching circuit 30 as explained above which is a negative bias through resistor 256, resistor 272 and resistor 300 with the transistor 254 on is sufficient to maintain the switch 276 in the open condition.

The adjustable blanking circuit 26 which, as previously indicated, is connected to receive the output signal from the gate control circuit 146 is operable to close the gate circuit 66 in the current increase and decrease circuit 16 for a selected period between two-tenths of a second and ten seconds in duration to allow the circuit 16 to stabilize. The current increase and decrease circuit 16 requires additional time to stabilize during start-up of apparatus 12 since the current increase and decrease is a function of current flow through the electrolyte between the work and tool and therefore has a dynamic characteristic not present in the maximum current, spark detect and voltage surge circuits.

Since the adjustable blanking circuit 26 has been considered in detail in patent application, Ser. No. 585,395, referenced above, it will not be considered in detail herein.

Similarly, since the line transient circuit 34 has been considered in detail in patent application, Ser. No. 585,-395, referenced above, it will likewise not be considered in detail herein, except to point out that the function of the line transient circuit 34 is to provide a signal to the gate 66 of the current increase and decrease circuit to prevent a signal therefrom being sent to the switching circuit 30 when the current increase or decrease sensed by the current increase and decrease circuit 16 has been due to a transient line signal rather than an undesirable characteristic of the cutting circuit 34 of the electro-chemical machining apparatus 12. Thus during a transient signal and for a short time thereafter to allow stabilization of the line signal and the signal through the current increase and decrease circuit 16, the current increase and decrease circuit 16 is ineffective to cause shutting down of the electro-chemical machining apparatus 12 due to the presence of a blanking signal from the line transient circuit 34 at the gate 66.

Figure 5:
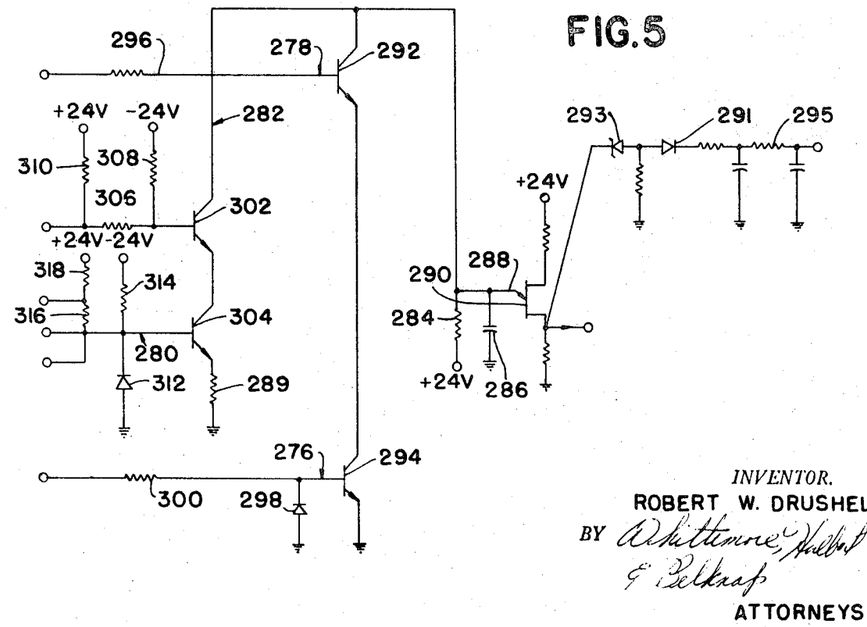
FIG. 5 is a schematic diagram of the switching circuit of the block diagram of FIG. 1.

The switching circuit 30 which is illustrated best in FIG. 5 includes the four separate switches 276, 278, 280 and 282. As shown in FIG. 1, the switches 276 and 278 are connected in series and are in parallel with the series connected switches 280 and 282. The switches 278 and 282, as best shown in FIG. 5, are connected to a twenty-four volt positive power supply through the resistor 284, while the switches 276 and 280 are connected to electronic common. The resistor 284 is connected across capacitor 286 to the emitter 288 of the unijunction transistor oscillator 290 in the output control circuit 32.

Thus in operation when both of the switches in either of the parallel paths through the switches are closed to return the emitter 288 of the unijunction transistor oscillator 290 to electronic common, no oscillation of the oscillator will occur and no output will be present from the output control circuit 32 calling for shutdown of the electro-chemical machining apparatus 12. When however a single switch circuit is open in both parallel branches of the switching circuit 30, the twenty-four volt source of electrical energy will provide a trigger signal to the emitter 288 of the unijunction transistor oscillator 290 to turn the oscillator on and thus provide an output from the output control circuit 32 to shut down the electro-chemical machining apparatus 12, as will be considered subsequently.

Specifically the switch 278 of the switching circuit 30 includes the transistor 292 having a collector connected directly to the emitter 288 of the unijunction transistor oscillator 290 and an emitter connected to the collector of the tarnsistor 294 of the switch 276 of the switching circuit 30. The emitter of the transistor 294 is connected directly to ground, as illustrated in FIG. 5. The base of the transistor 292, as previously indicated, is connected to the collector of the transistor 232 in the control signal amplifier circuit 152 through the current limiting resistor 296 and resistor 242. Similarly the base of the transistor 294 is connected across the protecting diode 298 and through the current limiting resistor 300 and resistor 272 to the collector of the transistor 254 of the preset blanking circuit 28.

In normal operation of the apparatus 12 the transistors 292 and 294 are normally conducting, that is the switches 276 and 278 are closed due to the positive twenty-four volts applied through the indicated circuitry to the base thereof. When the transistor 232 is turned on the twenty-four volts are returned toward ground through the transistor 232 so that the minus twelve volt source of electrical energy which has previously been bucked by the twenty-four volts of electrical energy through the resistor 242 is placed on the base of the transistor 292 to cause the transistor to stop conducting. Similarly, when the transistor 254 conducts, a negative bias signal is applied through the transistor 254 to the transistor 294 to stop the transistor from conducting or in effect open the switch 276.

Similarly, as illustrated in FIG. 5, the switch 282 includes the transistor 302 which has the collector connected directly to the emitter 288 of the unijunction oscillator 290 and the emitter connected to the collector of the transistor 304 of the switch 280. The emitter of transistor 304 is returned to electronic common through resistor 289 as shown. The base circuit of the transistor 302 is connected to the output conductor of the voltage short or spark-over circuit 20 which it will be remembered is also the output of the voltage surge circuit 22 through the current limiting resistor 306 and across the resistor 308 and the resistor 310 connected respectively to the minus twelve volt and plus twenty-four volt sources of electrical energy, as shown in FIG. 5. The base of the transistor 304 is connected across the diode 312 and across the resistance 314 connected to the negative twelve volt source of electrical energy to the gate circuit 66 of the current increase and decrease circuit 16 and to the collector of the transistor 177 of the voltage threshold circuit 142 through diode 246 and resistor 248. The base of the transistor 304 is further connected through resistor 316 to the maximum current circuit 18 and to the twenty-four volt source of electrical energy through the resistor 318.

Thus the transistor 302 is normally conducting to close switch 282 due to the twenty-four volt signal placed on the base thereof which is dominant over the negative twelve volt source of electrical energy. However, any time the output transistor of the circuit 20 is turned on a negative bias is placed on the base of the transistor 302 to turn the transistor 302 off and thus open the switch 282. Similarly any time the output transistor in the previously considered current maximum circuit 18 is turned on or any time the output transistor of the current increase and current decrease circuit 16 is turned on, and any time the output transistor in the voltage threshold circuit 142 is turned off after the initial blanking period provided by the preset blanking circuit 28, a negative bias is applied to the base of the transistor 304 through the resistor 314 assisted by the voltage on the collector of transistor 177 in the latter case to cause the transistor 304 to stop conducting, whereby the switch 280 is open.

The output control circuit 32 has been considered previously in conjunction with the maximum current limit circuit in patent application, Ser. No. 573,999, and will not therefore be considered in detail herein. It will be sufficient to point out that the unijunction transistor oscillator 290 is the same as the unijunction transistor oscillator 198 in this prior patent application and that the emitter 288 can be energized by any of the indicated combinations of the switch circuits 276, 278, 280 and 282 in the switching circuit 30.

The pulse circuit 320 and the silicon controlled rectifier circuit 322 are intended to include the circuitry associated with the transformer 194 and silicon controlled rectifier 214 disclosed in the prior referenced patent application and the relay coil 324 is intended to indicate any means for effecting control of the circuit protected by the electronic control circuit 10, as indicated in the above referenced patent application, including but not limited to a relay for breaking the energizing circuit of the electro-chemical machining apparatus 12.

Thus in overall operation of the electronic control circuit 10, it will be seen that with the electro-chemical machining apparatus 12 not operating, the switches 276, 278 and 282 are normally closed and switch 280 is normally open when the control circuit 10 is energized so that the unijunction transistor oscillator 290 is not oscillating with no signal provided on the emitter electrode 288 thereof. Therefore, no signal is provided from the output control signal circuit 32.

On start-up of the electro-chemical machining apparatus 12 the voltage and current in the cutting circuit 44 both tend to rise together. If the current reaches the preselected percentage of the maximum allowable current selected in the circuit 148 before the voltage across the gap between the work and tool reaches the voltage threshold level determined in circuit 142, an output will be provided from the control signal amplifier 152 to open the switch 278 of the switching circuit 30, so that the oscillator 290 will be turned on since the switch 280 is already open so that both parallel branches of the switching circuit 30 is open and the ground is removed from the emitter of the unijunction transistor oscillator 290.

Similarly if a voltage spark is sensed through the voltage short or gap spark-over circuit 20 during the start-up period of the electro-chemical machining apparatus 12, the switch 278 will be opened along with the switch circuit 282 to shut the electro-chemical machining apparatus 12 off due to operation of the unijunction transistor oscillator 290.

Again if for example the tool 50 were shorted against the work 48 on start-up of the electro-chemical machining apparatus 12, the current would reach the preset percentage in the current percent select circuit 148 before the voltage between the work and tool attained the threshold value so that the switch circuits 278 and 280 would both be open to provide a signal output from the output control circuit 32, as previously indicated.

After the half second blanking provided by the preset blanking circuit 28, the parallel branch of the switching circuit 30 including the switches 276 and 278 will always be open due to open due to opening of the switch 276.

Thus, after the half second blanking period, only a voltage short or spark-over or a voltage surge effective to open the switch circuit 282 or a return of the threshold voltage below the preselected threshold on a current greater than the selected maximum current or an undesirable current increase or decrease, each of which would be effective to open the switch 280, would be effective to produce an output from the output control circuit 32 to shut down the electro-chemical machining apparatus 12, as previously indicated.

In addition it will be noted that the signals from the current increase and decrease circuit 16 effective to open the switch 280 will be present only after a longer adjustable blanking period sufficient to permit stabilizing of the current during machine start-up. Further, should current increase or decrease be due to a line transient signal rather than an undesirable cutting condition in the cutting circuit 44 of the electrochemical machining apparatus 12, due to the line transient circuit 34, the current increase and decrease circuit 16 will not be permitted to provide an output to open the switch 280.

Thus it will be seen that in accordance with the invention there is provided an electronic control circuit for sensing the parameters of an electric circuit and providing an output signal in response thereto effective to control the electric circuit in accordance with the sensed parameters or combinations thereof.

Further, it will be noted that the parameters of the electric circuit are sensed in such a way and that the separate sensing circuits are so constructed that the entire control circuit 10 may be implemented on separate control cards, most of which are non-essential to the operation of the remainder of the cards. Thus, the voltage short or gap spark-over circuit 20 may, for example, be removed from the control circuit 10, and the control circuit 10 will still operate. In such case the voltage threshold circuit 142 alone or the voltage threshold circuit in conjunction with the percent of maximum current circuit 148 would provide an output from the output control circuit 32 due to a voltage short or gap spark-over.

Likewise, it will be seen that due to the parallel arrangement of the switches of the switching circuit 30 that the current increase and decrease and current maximum circuits along with the voltage threshold circuit and the voltage short and voltage surge circuits back up each other so that if there is a fault in any of these parameters, there will be an output from the output control circuit 32 even though one of the circuits is inoperative.

Also, it will be noted that the separate circuits indicated have been designed in the detailed circuitry to be removable without interruption in the protection provided by the remaining portion of circuit 10. Thus machine down time and maintenance problems are greatly reduced with the use of the electronic control circuit 10 which is at the same time relatively simple, economical and efficient.

In addition to the operation of the electronic control circuit 10 indicated above, the indicator lamp circuit 36 is provided to show the type of fault which has caused the electronic control circuit 10 to shut down the electro-chemical machining apparatus 12. Thus, as pointed out above, if the electro-chemical machining apparatus 12 is turned off as a result of a voltage surge, a current decrease, a current increase, current over a maximum preset limit or a voltage short or gap spark-over the signal lamps 132, 74, 72, 330 or 332 respectively will turn on and stay on until the lamp circuits are reset, as for example by recycling the electronic control circuit 10. In addition, during normal start-up of the electro-chemical machining apparatus 12 the lamps 132, 74, 72, 330 and 332 flash briefly to indicate operation thereof and are automatically reset at this time.

More specifically, as shown in the block diagram of FIG. 2, the indicator lamp circuit 36 includes the lamp input gate circuit 334, operable on energization of the amplifier 336 due to a signal from the lamp input gate control circuit 337 on operation of the unijunction transistor oscillator 290, to release the clamping circuits 338, 340, 342, 344 and 341 whereby a signal input on the conductors 130, 70, 68, 78 or 84 respectively indicating a voltage surge, current decrease, current increase, current over maximum limit or voltage short which is objectionable may be coupled to the associated lamp circuit 132, 74, 72, 330 or 332, through the voltage surge signal storage circuit 347 and signal coupling circuit 348, the signal coupling circuits 350, 352 and 354, and the voltage short signal storage circuit 355 and signal coupling circuit 356 respectively, to energize the lamp circuit which is in conjunction with the coupling circuit through which a signal indicating an undesirable condition is passed.

The indicator lamp circuit 36 further includes the automatic lamp latch-out circuit 339 provided to reset the gate circuit 334 substantially immediately on one of the lamp circuits 132, 74, 72, 330 or 332 being energized to prevent the other lamp circuits from being energized due to electrical characteristics in the machining circuit 44 of the electrochemical machining apparatus 12 caused by shutting down the apparatus due to the originally sensed undesirable characteristic of the machining circuit 44.

At the same time the automatic lamp latch-out circuit 339 provides an output to the lamp circuit voltage holding circuit 37 to maintain the indicator lamp circuit 36 energized even though the machining apparatus 12 may be shut down as by pressing a stop-button on the apparatus 12, for example.

Because extraneous signals are present during shutdown of the electro-chemical machining apparatus 12 which would tend to reset the lamp circuits at this time, by energizing the lamp reset circuit 343, a signal is provided through the lamp reset clamping circuit 345 to prevent resetting of the lamp circuits during shut-down of the electro-chemical machining apparatus 12.

Subsequently on starting up of the electro-chemical machining apparatus 12, a signal will be provided through the lamp reset driver amplifier 348 to the lamp reset circuit 343 to automatically reset the lamp circuits 132, 74, 72, 340 and 330 to turn out the lamp indicating the original undesirable condition which at this time should have been corrected. This signal is provided from the gate control circuit 146 over the conductor 346 to the lamp reset driver amplifier 349.

Figure 6:
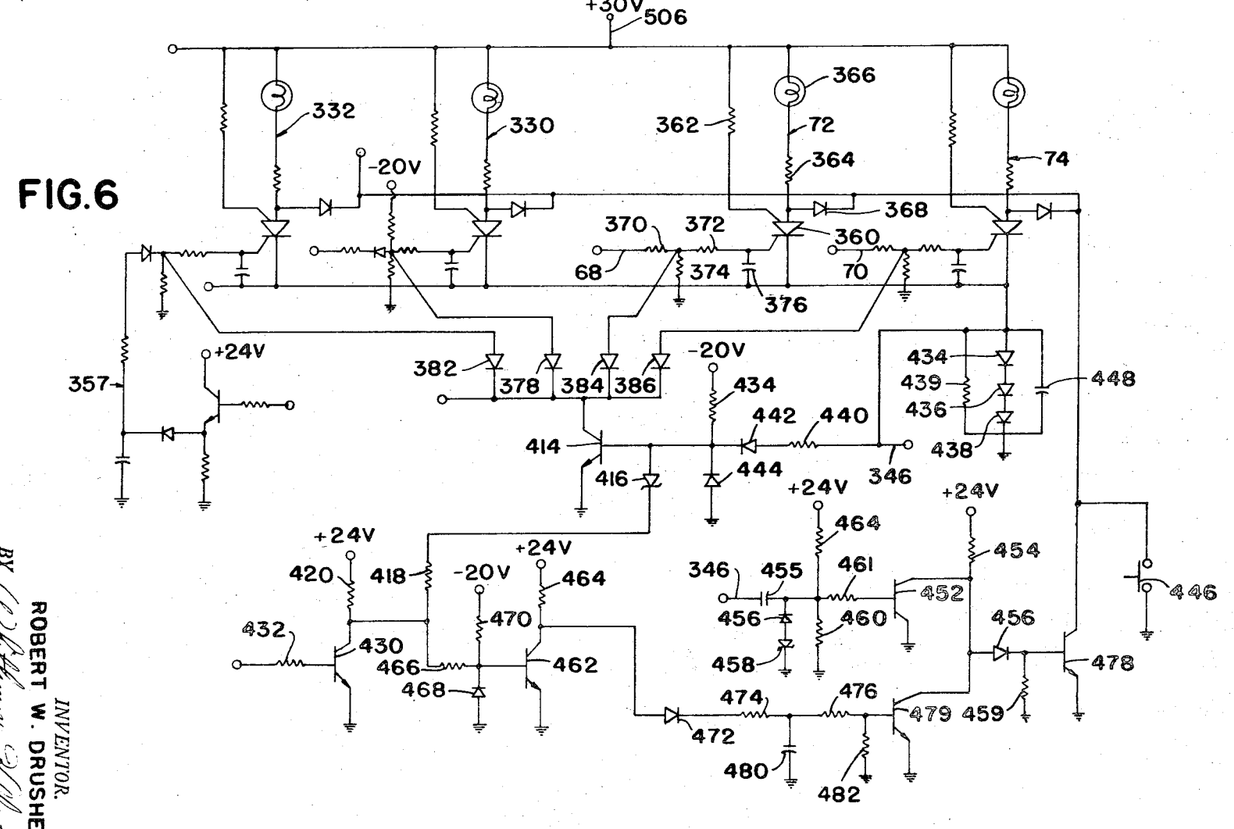
FIG. 6 is a schematic diagram of a portion of the indicator lamp circuit of the block diagram of FIG. 2.
Figure 7:
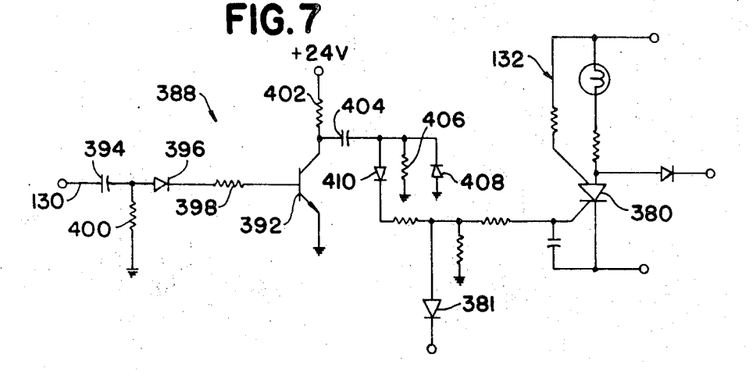
FIG. 7 is a schematic diagram of another portion of the indicator lamp circuit of the block diagram of FIG. 2.

The schematic diagram of the indicator lamp circuit 36 is illustrated in FIGS. 6 and 7. Each of the lamp circuits 132, 74, 72, 330 and 332 are substantially the same so that only the current increase lamp circuit 72 will be considered in detail.

The current increase lamp circuit 72 includes the four electrode silicon controlled rectifier 360, the anode gate and anode of which are connected through a resistor 362 to a source of positive thirty volt direct current electric energy and through a resistor 364 and the current increase lamp 366 to the same source of positive voltage. The cathode of the silicon controlled rectifier 360 is connected directly to the automatic lamp latch-out circuit 339 while the cathode gate is connected to the signal coupling circuit 352.

Thus in operation when a signal is provided from the signal coupling circuit 352, current will flow through the silicon controlled rectifier 360 to cause the lamp 366 to light. The silicon controlled rectifier 360 is subsequently turned off by drawing the anode to a potential below the potential on the cathode through diode 368 as will be seen subsequently.

The signal coupling circuits 348, 350, 352, 354 and 356 are also similar. Therefore again the circuit 352 will be the only signal coupling circuit considered in detail. In the signal coupling circuit 352 a signal is passed from conductor 68 through the two resistors 370 and 372 across the resistor 374 and capacitor 376 to fire the silicon controlled rectifier in the current increase lamp circuit 72 when the junction of the resistors 370, 372 and 374 is not grounded through the diode 384 and conducting transistor 414. Similarly the voltage surge lamp circuit 132, the voltage short lamp circuit 332 and the lamp circuits 330 and 74 will be turned on when the coupling circuits 348, 356, 354 and 350 respectively are not grounded through diodes 380, 386, 384 and 382 and transistor 414 respectively and they receive a signal through the respective signal coupling circuits.

The voltage surge signal storage circuit 347 shown best in FIG. 7 includes the amplifier circuit 388. The amplifying circuit 388 includes the normally off transistor 392 for receiving the voltage surge signal over the conductor 130 on the base thereof through the capacitor 394, diode 396 and current limiting resistor 398 across the resistor 400.

The emitter of the transistor 392 is returned directly to ground while the collector of the transistor is connected to a positive twenty-four volt source of electrical energy through the resistor 402. The output of the transistor 392 is then fed through the capacitor 404 which inverts the sign thereof and provides a time constant to lengthen the output pulse across the resistor 406 and limiting diode 408 to feed the signal coupling circuit 348 which is similar to the signal coupling circuit 352 through the diode 410.

The purpose of the voltage surge signal amplifier circuit 347 having the input time constant including the capacitor 394 and resistor 400 is to increase the amplitude and duration of the voltage surge signal from the circuit 22 since it is small in both amplitude and duration to insure turning on of the voltage surge lamp circuit 132 in response to a voltage surge characteristic operable to shut down the electro-chemical machining apparatus 12.

A similar voltage short signal storage circuit 357 having a time constant associated therewith is provided in conjunction with the spark-over circuit 20 to insure operation of the voltage short lamp circuit 332 in response to a fault detected by the circuit 20.

The lamp input gate 334 comprises the transistor 414 having an emitter connected directly to ground and having a collector connected to the diodes 381, 382, 378, 384 and 386. The base of the transistor 414 is during operation of the electronic control circuit 10 without an undesirable machining circuit condition connected to a source of positive twenty-four volt direct current through the Zener diode 416, resistor 418 and resistor 420. Thus with the amplifier 336 in its normally off condition due to no pulse being supplied thereto from the lamp input gate control circuit 337 due to operation of the unijunction transistor oscillator 290 to provide an output across the filter network 291 the transistor 414 is turned on so that each of the coupling circuits 348, 350, 352, 354 and 356 are clamped at ground potential and the signal lamps cannot be turned on.

On occurrence of a fault in the machining circuit 44 of the electro-chemical machining apparatus 12 sensed by the electronic control circuit 10 the unijunction transistor oscillator 290 is caused to turn on to supply an actuating pulse to the lamp input gate control circuit 337 including a pivot voltage setting Zener diode 293, blocking diode 291 and filter circuit 295 to turn on the transistor 430 in the amplifier circuit 336. Transistor 430 has the emitter connected directly to electronic common, the collector connected to the positive twenty-four volt source of electrical energy through the resistor 420 previously indicated, and a base connected through the resistor 432 directly to the lamp input gate control circuit 337.

Thus on occurrence of an undesirable machining parameter or characteristic the positive potential on the base of the transistor 414 is removed whereby the negative potential connected to the base of the transistor 414 through the resistor 434 will cause the transistor 414 to turn off, unclamping all of the signal coupling circuits 348, 350, 352, 354 and 356 from electronic common whereby the machining circuit fault will cause one of the silicon controlled rectifiers in the lamp circuits 132, 74, 72, 330 and 332 to be energized. Thus the fault which has caused operation of the unijunction transistor oscillator 290 will cause the corresponding indicator lamp circuit to be energized.

Immediately on energizing the silicon controlled rectifier in for example the current increase circuit again the current through the silicon controlled rectifier 360 which causes the lamp 366 to light will pass across the series diodes 434, 436, and 438 in parallel with resistor 439 to provide a signal through the resistor 440 and blocking diode 442 and again across the clamping diode 444 to again place a positive bias on the base of the transistor 414 to immediately reclamp the remaining signal coupling circuits 348, 350, 352, 354 and 356 to electronic common. Thus additional signals appearing as faults due to shut-down of the electro-chemical machining apparatus 12 initiated by the initial fault signal will not be allowed to light additional fault indicating lamps. The current increase lamp 366 will however remain on.

When it is desired to reset the indicator lamps with any or all of the lights on, a manual reset button 446 is provided connected through the diodes 368 to the anodes of the silicon controlled rectifiers of the lamp circuits and connected to electronic common. Thus on pressing of the manual reset button 446 the anodes of the lamp circuits, silicon controlled rectifiers are returned to ground while the cathodes are maintained at some voltage above ground by the diodes 434, 436, and 438 in parallel with the capacitor 448 which will maintain a positive charge across the diodes for a time sufficient to turn the silicon controlled rectifiers off.

If after the fault which has caused shutting down of the electro-chemical machining apparatus 12 has been corrected the apparatus is restarted. A signal will be provided from the conductor 346 of the gate control circuit 146 which is fed to the normally on transistor 452 of the lamp reset driver amplifier circuit 349 through the capacitor 455 across the diode 456 and the Zener diode 458 to protect the transistor 452 from inverse voltage and excessive voltage across resistor 460 and through current limiting resistor 461 to turn the normally on transistor 452, the base of which is connected to the positive twenty-four volt electric energy source through resistor 464, off. When the transistor 452 is turned off the positive twenty-four volt source of electrical energy which is connected to the collector of the transistor 452 through the resistor 454 is released from ground through the emitter of the transistor 452 whereby a substantial potential is applied through the diode 456 and across resistor 459 to the base of the normally off transistor 78 to drive the transistor 78 to saturation and again connect the anodes of the silicon controlled rectifiers in the lamp circuits directly to ground through the emitter collector circuit of the transistor 478 to again reset the lamp circuits on recycling of the electronic control circuit 10.

During the shut-down of the electro-chemical machining apparatus 12 there is a tendency for signals to appear across the capacitor 455 which would tend to reset the lamp circuits so that after the apparatus was shut down, it would not be known what type of fault caused the shutdown. Therefore the lamp reset clamping circuit 344 has been provided. The circuit 344 includes the normally on transistor 462 having the emitter connected directly to ground and the collector connected to the twenty-four volt source of electrical energy through the resistor 464 and the base connected to the collector of the transistor 430 in the amplifier circuit 336 through current limit resistor 466 across the diode 468. The base of the transistor 462 is additionally connected to the source of negative twenty volt electrical energy source through the resistor 470, as shown.

Thus when a fault is sensed to turn the transistor 430 on which also calls for shutting off of the electro-chemical machining apparatus 12, the positive twenty-four volts is taken off of the base of the transistor 462 so that the negative twenty volts through the resistor 470 is effective to cut the transistor 462 off. The positive twenty-four volts through the resistor 464 is thus transferred through diode 472, resistor 474 and resistor 476 to the base of the transistor 479 across the capacitor 480 and resistor 482.

The normally off transistor 479 is thus turned on to provide a ground for the positive twenty-four volts should the ground through the transistor 452 be lost due to extraneous signals applied to the base thereof during shut-down of the electro-chemical machining apparatus 12. The capacitor 480, resistors 476 and 482 form a time constant circuit such as to maintain the transistor 479 in an on state as long as there is any danger of transient signal appearing across the capacitor 455 due to shut-down of the electro-chemical machining apparatus 12.

In addition to the above functions of the lighting circuit 36 a signal is provided out of the automatic lamp latch-out circuit 339 on the conductor 340 at the initiation of the turning on of one of the light circuits due to a fault being sensed by the electronic control circuit 10 which signal is fed to the lamp voltage source holding circuit 37 illustrated in FIG. 8 through the resistor 488 and diode 490 to cause the normally off transistor 492 to conduct in opposition to the negative twenty volt bias applied thereto through the resistor 494. The conduction of the transistor 492 between the emitter which is connected to electronic common and the collector will energize the relay coil 498 through the resistor 500 and the source of voltage 39 to close the relay contact 504 and maintain the voltage output on the conductor 506 to the indicator lamp circuit 36 even though the slower acting relay 508 is subsequently opened on shutting down of the electro-chemical machining apparatus 12. The resistor 495 and capacitor 496 are provided in series between the emitter and collector of the transistor 492. As shown the relay 508 is normally maintained closed by the energizing of the relay coil 510 in the control circuit for the electro-chemical machining apparatus 12 and may be deenergized as for example by pressing the apparatus off-button.

The circuit 39 will not be considered in detail since it is a relative straight forward source of regulated positive twenty-four volt electrical energy and negative twenty volt electrical energy which may be used to supply the operating voltages of the electronic control circuit 10 where needed as will be understood by those skilled in the art.

The voltage checking circuit 41 is provided to turn off the electro-chemical machining apparatus 12 if the negative twenty volt and positive twenty-four volt energizing signals from the circuit 39 are below a predetermined minimum so that the circuit 10 will not operate correctly.

Thus the positive twenty-four volt signal will when it is present or within allowable limits actuate the transistor 514 to energize the relay coil 516 and maintain the contacts 518 and 520 closed. Similarly the negative twenty volt source of electrical energy from the circuit 39 will, when it is above a set minimum voltage, energize the transistor 524 to energize the relay 526 and maintain the relay contacts 528 and 530 closed.

The relay contacts 518 and 528 in series and the relay contacts 520 and 530 in series are in parallel and in a series with the energizing circuit for the main power supply of the electro-chemical machining apparatus 12 and with the parallel diodes 532 and 534 which are used alternatively. When the power from the rectifier of the electro-chemical machining apparatus 12 is not present even though at least one set of the relay contacts 518 and 528, and 520 and 530 are energized, the relay 536 will not be energized so that the relay contacts 538 and 540 actuated thereby will be opened to prevent operation of the electro-chemical machining apparatus 12.

Thus all of the voltages necessary to proper operation of the electro-chemical machining apparatus 12 are checked by the circuit 41 and the electro-chemical machining apparatus 12 is turned off if any of these voltages are not present.

What I claim as my invention is:

1. An electronic control circuit for use in conjunction with electro-chemical machining apparatus or the like comprising means for simultaneously sensing a plurality of parameters of an electric circuit and providing an output signal for each parameter when the parameter has an undesirable characteristic to provide a logic pattern of output signals, switching means operably associated with the sensing means for receiving the output signals from the sensing means including two pair of series connected switches each switch of each pair being connected in parallel with one switch of the other pair of switches and means operably associated with and actuated in response to at least one of the switches in each pair of series connected switches in the switching means being open for providing an output signal in accordance with the logic pattern of the output signals received by the switching means operable to control the electric circuit to provide an output signal only in response to at least one of the switches in each pair of series connected switches being open to control the electric circuit.

2. Structure as set forth in claim 1 wherein the parameters sensed include at least one of the parameters, current increase, current decrease and maximum current.

3. Structure as set forth in claim 1 wherein the parameters sensed include at least one of the parameters, voltage short, voltage surge and threshold voltage.

4. Structure as set forth in claim 1 and further including preset means operably associated with the switching means for blanking a portion of the switching means for a predetermined time after the electric circuit voltage has reached a predetermined threshold voltage.

5. Structure as set forth in claim 1 wherein at least one of the parameters sensed has dynamic characteristics and further including adjustable means operably associated with the means sensing the one parameter for blanking the means sensing the one parameter for a selectable time after the electric circuit voltage has reached a predetermined threshold voltage.

6. Structure as set forth in claim 1 and further including means for sensing a power line signal input to the electric circuit and means operably associated with the power line signal input sensing means for blanking the output of at least one of the parameter sensing means in response to a transient power line signal for a time determined by the duration and magnitude of the transient signal.

7. Structure as set forth in claim 1 wherein the sensing means includes means for sensing a threshold voltage in the electric circuit and further including means operably associated with the threshold voltage sensing means for providing a predetermined blanking signal for a predetermined time after the threshold voltage is reached in the electric circuit in response to the threshold voltage being reached in the electric circuit, and means for closing one of the switches in one of the series circuits in the switching means in response to the blanking signal.

8. Structure as set forth in claim 7 wherein the sensing means further includes means for sensing voltage shorts in the electric circuit and further including means responsive to the means for sensing voltage shorts for opening the other switch in said one series circuit and one of the switches in the other series circuit within said predetermined time when said blanking signal is present.

9. Structure as set forth in claim 1 wherein the sensing means includes means for sensing a threshold voltage in the electric circuit and a preselected percent of the maximum current in the electric circuit and further including means for opening one of the switches in one of the series circuits in the switching means in response to the current in the electric circuit reaching the preselected percent of the maximum current before the voltage has reached the threshold voltage.

10. Structure as set forth in claim 1 wherein the sensing means includes means for sensing voltage shorts in the electric circuit and means for sensing voltage surges in the electric circuit and the switching means includes means for opening one of the switches in one of the sets of series switches in the switching circuit in response to either a voltage short or voltage surge.

11. Structure as set forth in claim 1 wherein the sensing means includes means for sensing a threshold voltage in the electric circuit, means for sensing maximum current in the electric circuit and means for sensing current increases and decreases in the electric circuit and the switching means includes means for opening one of the switches in one of the sets of series switches in the switching circuit in response to any of a current increase or decrease, a maximum current or a voltage decreasing through the threshold voltage.

12. Structure as set forth in claim 1 and further including indicator lamp circuit means operably associated with the sensing means and means for providing an output signal which lamp circuit means is responsive thereto for providing an indication of the sensed electric circuit parameter producing operation of the means for providing an output signal.

13. Structure as set forth in claim 12 wherein the indicator lamp circuit means includes means for automatically resetting the indicator lamp circuit means on recycling of the control circuit.

References Cited

UNITED STATES PATENTS

| | | | |
|---|---|---|---|
| 2,495,981 | 1/1950 | Parkerson | 340—253 |
| 2,775,752 | 12/1956 | Hoberman | 340—253 |
| 3,246,310 | 4/1966 | Keller et al. | 340—213 |

THOMAS B. HABECKER, Primary Examiner

U.S. Cl. X.R.

340—253